United States Patent [19]
Baker

[11] 3,965,807
[45] June 29, 1976

[54] SLIDING PATTY GRILLER

[75] Inventor: Edward D. Baker, San Francisco, Calif.

[73] Assignee: N.P.I. Corporation, Burlingame, Calif.

[22] Filed: Feb. 19, 1974

[21] Appl. No.: 443,253

[52] U.S. Cl. .................................. 99/375; 99/423; 99/443 C; 99/446
[51] Int. Cl.² .......................................... A47J 27/14
[58] Field of Search ............. 99/325, 375, 280, 285, 99/342, 386, 389–390, 391–392, 400, 422, 423, 427, 443–444, 446; 198/160, 162, 164

[56] References Cited
UNITED STATES PATENTS

| | | | |
|---|---|---|---|
| 1,340,796 | 5/1920 | Schmidt | 198/164 X |
| 1,467,700 | 9/1923 | Wilson | 198/164 X |
| 1,609,736 | 12/1926 | Rennie et al. | 198/162 UX |
| 2,083,618 | 6/1937 | Salfisberg | 198/162 X |
| 2,555,193 | 5/1951 | Johnson | 198/162 X |
| 3,450,027 | 6/1969 | Lohr et al. | 99/423 |
| 3,456,578 | 7/1969 | Pinsly | 99/443 C X |
| 3,460,461 | 8/1969 | Langsam | 99/423 X |
| 3,610,134 | 10/1971 | Morley | 99/443 C X |
| 3,646,880 | 3/1972 | Norris | 99/443 C X |
| 3,693,533 | 9/1972 | Liepa | 99/443 C X |

*Primary Examiner*—Peter Feldman
*Assistant Examiner*—Arthur O. Henderson
*Attorney, Agent, or Firm*—Lothrop & West

[57] ABSTRACT

A sliding patty griller has a frame on which are horizontally mounted a lower heated platen and an upper heated platen parallel to each other and partially overlapped in plan. A conveyor slides patties first over the lower platen, then between the two platens and finally under the upper platen. The patties are supported, when off the lower platen but still under the upper platen, on a bar grid providing drainage. The conveyor has cross bars acting as pushers and in one instance the bars are scalloped to conform to the trailing wall of each patty. Weight bars over the initial portion of the lower platen hold the patties thereon in close contact therewith.

5 Claims, 5 Drawing Figures

U.S. Patent   June 29, 1976   3,965,807
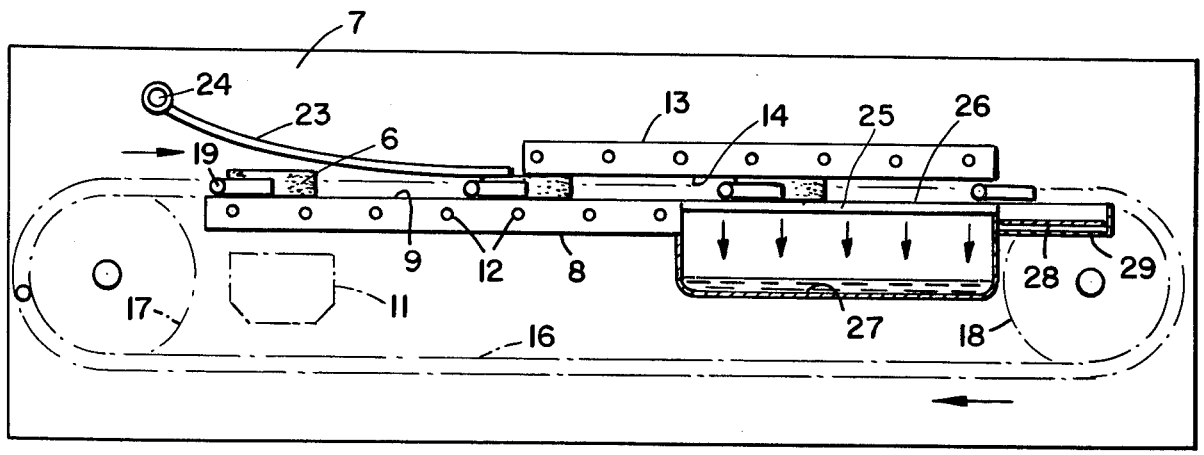
FIG_1
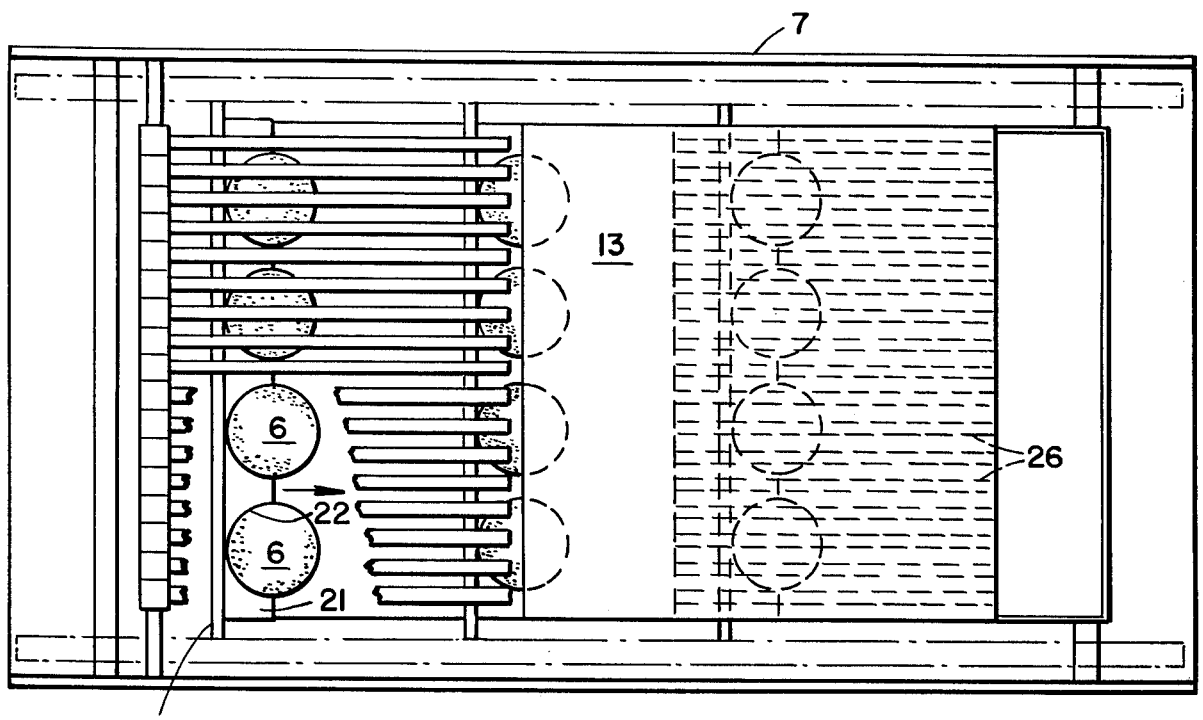
FIG_2
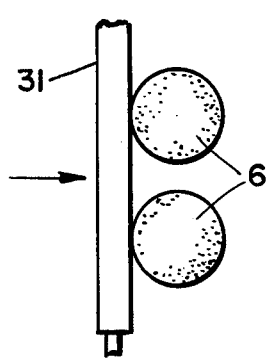
FIG_3
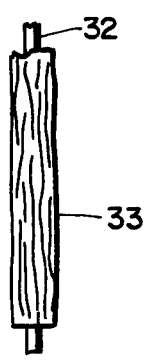
FIG_4
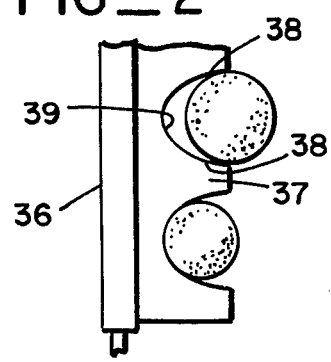
FIG_5

SLIDING PATTY GRILLER

In the increasing demand for the provision of cooked foods in a short time and in large quantities, there has developed a requirement for devices to provide satisfactorily grilled meat patties, for example, in a uniformly acceptable manner, in large volume and with only a small amount of labor.

It is therefore an object of the invention to provide a sliding patty griller which will operate satisfactorily to provide a large quantity of uniformly well-cooked patties with little labor and with high-rate, economical production.

Another object of the invention is to provide a sliding patty griller in which the starting material may be frozen yet in which the finished product can be promptly made available.

Another object of the invention is to provide a sliding patty griller in which the thermal arrangements are such as to be quite saving of cooking heat.

Another object of the invention is to provide a sliding patty griller in which the product is generally high quality.

A further object of the invention is to provide a sliding patty griller which is a relatively simple piece of machinery that can be maintained in a sanitary and acceptable condition at all times.

A further object of the invention is to provide a sliding patty griller which is relatively economical to manufacture and to operate.

A still further object of the invention is to provide a generally improved sliding patty griller.

Other objects of the invention, together with the foregoing, are attained in the embodiment thereof described in the accompanying description and illustrated in the accompanying drawings, in which:

FIG. 1 is a cross-section on a longitudinal, vertical plane through a sliding patty griller constructed in accordance with the invention, some parts being omitted and some parts being diagrammatically shown;

FIG. 2 is a plan of a machine pursuant to the embodiment of FIG. 1, certain portions being broken away and other portions being omitted to simplify the disclosure;

FIG. 3 is a fragmentary plan of an alternate form of cross bar for the conveyor;

FIG. 4 is a fragmentary view, in plan, of another form of cross bar for the conveyor; and FIG. 5 is a fragmentary view, in plan, of a further form of cross bar and plate.

While the sliding patty griller of the invention can easily be employed with various different starting materials and to provide various different end results, it has particularly been embodied for the grilling of a meat patty, preferably furnished initially in hard frozen form. The patty is herein represented as a geometrical body 6, in the present instance, being generally circular in plan and of a height approximately a sixth its diameter. In practice the patties are not quite as regular and have some variations in diameter, in configuration and in thickness. The illustration, however, is intended to be representative.

The machine includes a general frame 7 serving as a support and mounting for the remaining structure. Extending across the frame in a horizontal attitude is a lower platen 8. This is preferably a rectangular, metallic member having an upper surface 9 which is substantially planar and preferably is finished with a very low friction material such as Teflon. The platen 8 is heated in any appropriate fashion. There can be radiant gas heaters 11 installed below it on the frame. These are shown herein in dotted lines as they are extras or alternates since preferably the heat source includes embedded electrical heating coils 12. The heat is furnished very close to the region of use, thus diminishing transmission and radiation losses.

The lower platen is supplemented by an upper platen 13 likewise disposed transversely of the frame and in a generally horizontal position, being spaced above the lower platen a distance substantially equal to the nominal height or thickness of the customary patty. The upper metallic platen 13 has a lower face 14 of a low friction material such as Teflon and is arranged so that about a third of the initial portion of the upper platen overlies about the final one-third of the lower platen the remainder of the lower face of the upper platen being exposed. The platens may be considered to be staggered in plan, certain portions oppositely facing each other with the remaining portions exposed.

In order to impel patties to advance over, between and beneath the platens, there is provided a conveyor 16 made up of a pair of side chains trained around pairs of sprockets 17 and 18 and appropriately driven. The disposition of the chains permits them to carry between them a plurality of cross bars 19. The cross bars can vary in configuration and in one instance they are round and have a diameter just slightly less than the dimension between the upper and lower platens. These bars are effective to press against substantially the full height of the trailing portions of the patties 6.

In the present instance there is sufficient machine width to accommodate a plurality of patties in the same transverse row, for example four such patties are simultaneously loaded and a conveyor bar is effective to advance all four of them simultaneously. As an alternate each cross bar 19 can be made in a scalloped or indented form, as shown particularly in plan in FIG. 2. In this instance the bar includes a thick plate 21 thereon with arcuate pushing surfaces 22 conforming approximately to the contour of the trailing half of the four patties. There is a distributed pressure exerted on the entire half-periphery of each patty. In the event they are soft originally or after they become thawed and tend to deform when pushed, the patties are nevertheless confined reasonably well to their original configuration and are bodily propelled without distortion although they are still free to swell or shrink during cooking.

In the operation of this device the patties are deposited on the upper surface of the lower platen, toward the left in FIG. 1, and are shortly engaged by the next advancing cross bar 19 of the conveyor. As they advance the patties underride a plurality of weight bars 23 arranged side by side and freely pivoted on a cross shaft 24 spanning the walls of the frame. The configuration of the weight bars is such that as the patties advance they lift the weight bars more or less and so are pressed downwardly against the upper surface of the platen 8 by the bars. At any time, however, the bars 23 can be swung out of the way should they not be needed for a different type of item to be cooked or manner of cooking or for cleaning purposes. The bars 23 are preferably metal and serve in part as heat sinks for the platen 8 and as local heat transmitters for the patties.

As the patties advance they travel first over the lower platen without being greatly heated from above. This permits the initial thawing of a frozen product to begin from below and to accommodate itself well to the low friction surface of the platen under conditions of favorable heat transfer because the patty is in close physical and thermal engagement with the hot nether or lower platen.

When the patties have advanced approximately a third of the way through the machine they then also encounter the undersurface of the upper, heated platen 13. The top part of each patty then is quickly brought up to cooking temperature the grilling of each patty as a whole then takes place over a relatively short travel path. As the patties continue to advance and as the cooking has been substantially completed in the bottom and central portions, there is close contact with the lower surface 14 of the upper platen. The patties are still supported and held up by a grid 25 made up of a plurality of rods 26 cantilevered longitudinally from the platen 8 and in effect continuing the upper surface of such platen. The rods 26 are spaced far enough apart transversely so that any drainage of fat or the like from the patties can easily occur between them. At the same time the rods are adequate to support the patties. The rods 26 also take up some of the radiated heat from the upper platen and tend to maintain a relatively high temperature while the patties being advanced thereover drain and continue their cooking from above.

Drainage from the patties on the grid 25 is into a container 27 which can be drained or from time to time removed and emptied. As the patties are advanced by the conveyor bars they finally leave the upper platen 13 and are received on a tray 28 in an extension 29 of the container 27. The patties can continue to drain, although no longer being advanced. An attendant removes the cooked patties from the tray 28 for use.

In some instances it is desired to vary the configuration of the bars 19 somewhat. As indicated in FIG. 3, a bar 31 is made generally rectangular in cross-section and of a height substantially the same as the distance between the lower and upper platens. In passing between such platens the bar 31 acts as a scraper both top and bottom and is effective to keep the Teflon surfaces of the platens clean, smooth and unobstructed.

As a further modification, a conveyor bar can be provided as shown in FIG. 4. An inner bar 32 is circular in cross-section and of a diameter considerably less than the distance between the platens. The bar 32 readily receives a temporary or removable covering 33, for example, of rolled porous paper or the like. This can be clipped in place and is slightly oversize and deformable. When passed between the platens and over the Teflon surfaces it acts as a cleaner and wiper or swab to maintain the cooking surfaces in a sanitary condition.

As a still further modification, a cross member 36 is provided with or is integral with a plate 37, sometimes called a bar, especially contoured to avoid some slight imprinting or molding of the abutting patty by propulsion pressure and that some users object to. The plate 37, like the plate 21 in FIG. 2, is provided with scalloped or indented portions but in this case the pushing surface is not precisely of the same arcuate curvature in all portions. Rather the pushing surface has side portions 38 of relatively large arcuate curvature merging smoothly with a central portion 39 of relatively small arcuate curvature. The entire pushing surface is also comparable to a parabola or half of an ellipse but can be thought of simply as arcuate with portions of different radii. The side surfaces 38 conform approximately with the trailing portions of the sides of a standard size frozen patty while the central portion 39 conforms approximately with the trailing central portion of a standard size cooked patty. Shrinkage in cooking accounts for the different patty sizes.

At the start of patty feeding the frozen patty is advanced primarily by pressure on the relatively hard sides, as shown at the top of FIG. 5, and is pushed with some force between and in excellent thermal contact with the platens 8 and 13. The side contact area is sufficient so that there is little or no distortion of the patty. As the patty advances and is warmed and then cooked, it loses some moisture and fat and shrinks in size, both in thickness and in diameter. It thus advances with less propulsive force and tends to lag slightly by leaving contact with the plate sides 38 and assuming contact with the plate central portion 39, as shown at the bottom of FIG. 5. Again, there is adequate plate contact area to propel the patty with somewhat reduced force due to less thickness and lower coefficient of friction and without any imprint on the sides or at the rear.

What is claimed is:

1. A sliding patty griller for cooking patties having a frame defining a front and a rear, comprising:
   a lower stationary heated platen on said frame at the front thereof and having a substantially planar upper heated surface;
   an upper stationary heated platen on said frame at the rear thereof and having a substantially planar lower heated surface, said heated surfaces being substantially parallel and vertically spaced apart with the front portion of said upper platen overlying the rear portion of said lower platen;
   heating means for said platens to provide opposed cooking surfaces for said patties
   a foraminous support means extending rearwardly from said lower platen below the rear portion of said upper platen; and
   conveyor means having laterally extending pusher bars thereon arranged to move from the front to the rear of said griller, between said platens; whereby to slide patties over the front portion of said lower platen, then between said platens, then over said support means below the rear portion of said upper platen.

2. A patty griller as defined in claim 1 including a drip pan below said foraminous support, to catch drippings from patties thereon.

3. A patty griller as defined in claim 1 wherein said pusher bars are of a vertical dimension to wipingly slide over both said platen surfaces.

4. A patty griller as defined in claim 1 wherein each of said pusher bars is provided with a scalloped leading edge, each scallop having curved edges of diminishing radius of curvature to the bottoms thereof.

5. A patty griller as defined in claim 1 including downwardly biased means on said frame overlying the front portion of said lower platen and arranged to yieldably press patties against the upper surface of said lower platen.

* * * * *